United States Patent [19]

Strybel

[11] 4,109,536

[45] Aug. 29, 1978

[54] FLUID TEST DEVICE

[76] Inventor: Richard V. Strybel, Elk Grove Village, Ill.

[21] Appl. No.: 789,732

[22] Filed: Apr. 21, 1977

[51] Int. Cl.² .............................................. G01L 7/00
[52] U.S. Cl. ..................................................... 73/756
[58] Field of Search .......................... 73/420, 431, 756; 137/557, 608, 343

[56] References Cited

U.S. PATENT DOCUMENTS

| 3,118,463 | 1/1964 | Lacart | 137/343 |
| 3,438,260 | 4/1969 | Kowal et al. | 73/420 |

Primary Examiner—Donald O. Woodiel
Attorney, Agent, or Firm—Wegner, Stellman, McCord, Wiles & Wood

[57] ABSTRACT

A fluid test device having a manifold formed of elements machined from rod stock for high accuracy. The manifold defines open end portions to which are sealingly secured a pair of manifold valves having front operated handles. The manifold includes a threaded hanger recess for mounting of the device to a hanger or housing. The manifold and attached valves may be disposed within a snap-on cover having a back portion coplanar with the gauges connected to the valves to provide a stable, flat back surface to the device. The cover may be snapped on to protect the brazed connection after all of the testing of the device is completed. The valves and manifold are arranged to have a coplanar surface to provide automatic alignment relative to a common plane, permitting facilitated brazing of the valves to the manifold connectors.

11 Claims, 7 Drawing Figures

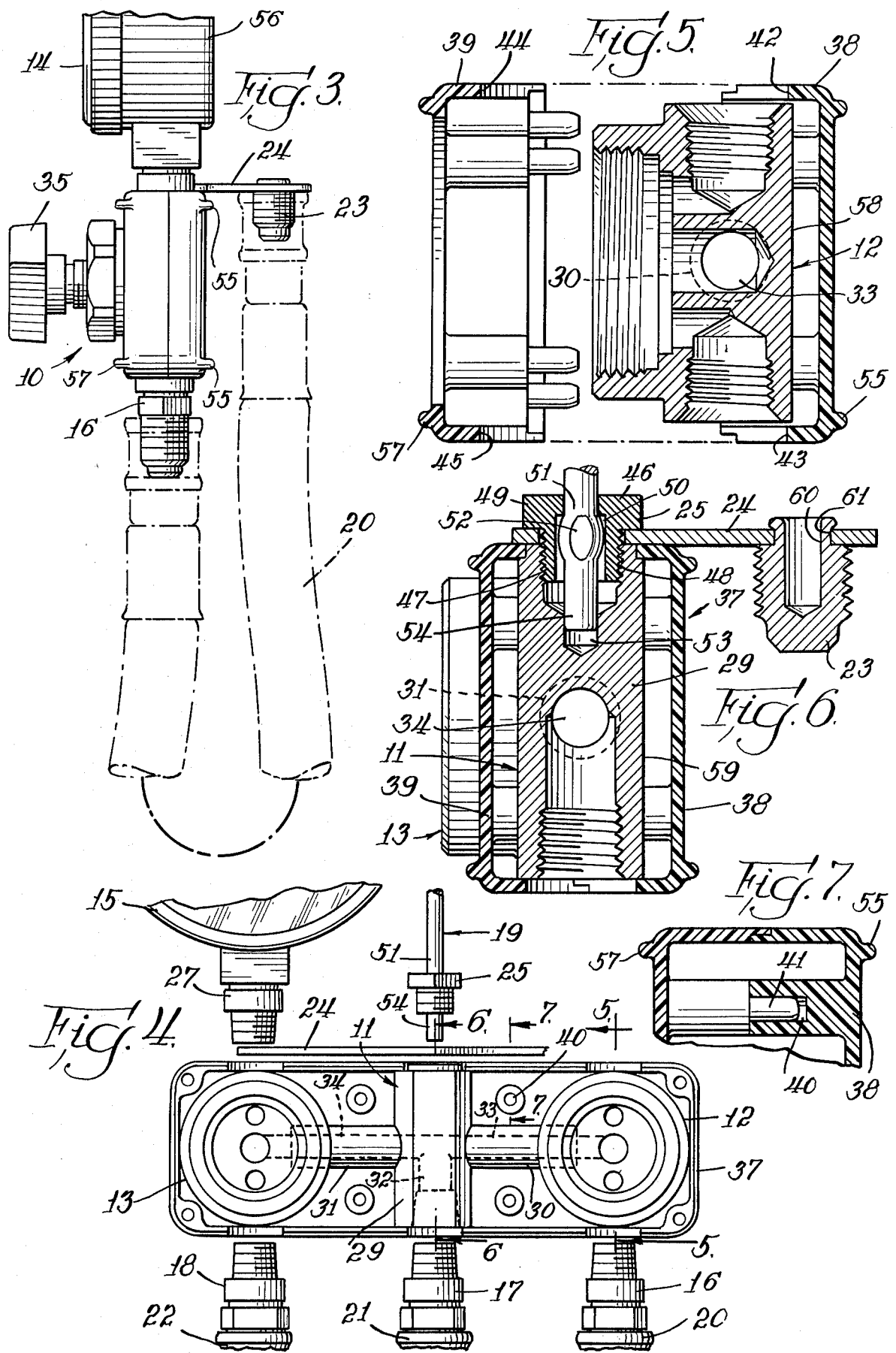

FLUID TEST DEVICE

BACKGROUND OF THE INVENTION

1. Field of the Invention

This invention relates to fluid test devices and in particular to valve manifold devices.

2. Description of the Prior Art

An improved form of fluid test apparatus is shown in U.S. Pat. No. 3,438,260, of Leonard J. Kowal et al, which patent is owned by the assignee hereof. As disclosed therein, such manifold devices utilize a plurality of flexible hoses for connecting a system to be tested through the manifold to suitable gauge means mounted to the manifold. The manifold body may comprise a casting having a plurality of suitable passages therein for interconnecting the valved connections and gauges. As taught in that patent, the manifold may be enclosed in a suitable housing.

Another improved fluid test apparatus utilizing a manifold, gauges, and valves is shown in my copending application for U.S. Pat. Ser. No. 699,537, entitled "Fluid Test Apparatus", filed June 24, 1976. In that application, an improved device is shown wherein one of the hose connectors is made to provide a flow capacity at least substantially equal to the cumulative flow capacity of a plurality of others of the connectors.

A number of other valved manifold gauge devices for fluid testing have been developed. Illustratively, as shown in U.S. Pat. No. 1,797,591, of Jack D. Sartakoff, a plurality of valve blocks are provided having aligned passages with members at the opposite ends of the assembly being provided for closing the passages. Each of the blocks is fitted with a suitable valve, and at least one of the blocks may be fitted with a suitable gauge.

Robert L. Bradford, in U.S. Pat. No. 2,212,466, shows a pressure leakage gauge wherein the gauge is mounted to a block having a pressure reservoir with a valve intermediate the reservoir and a source of fluid pressure.

In U.S. Pat. No. 2,238,958, of Weaver R. Wells, a refrigerant testing device is shown to comprise a plurality of machined elements interconnected to define interconnecting flow passages with a number of needle-type valves disposed within a number of the passages. Gauges are associated with a number of the interconnected elements.

Julian A. Campbell, in U.S. Pat. No. 2,355,270, shows a boiler feed water control having a manifold provided with a plurality of needle valves for controlling fluid flow, the manifold further having connected to one of the passages a suitable gauge.

Otis M. Liley, in U.S. Pat. No. 2,821,210, shows a multiple orifice metering mechanism having a plurality of fittings interconnected by suitable conduits and having suitable control gauges associated with at least a portion of the fittings for controlling fluid flow.

In U.S. Pat. No. 2,936,000 of John C. Mason, a combination valve and gauge assembly is disclosed wherein a valve is mounted to a fitting having a conduit fitted thereto mounting a suitable gauge.

Jacob M. LeBeaux et al, in U.S. Pat. No. 3,050,126, show an integral well head assembly having a manifold provided with a plurality of passages and a gauge connected through a valve connector to the manifold.

Rollin H. LaCart shows, in U.S. Pat. No. 3,118,463, a manifold having a number of bosses for connection thereto of valve and hose connectors, as well as gauges.

The valves may comprise conventional needle valves operable from opposite ends of the manifold body to control fluid flow through passages within the manifold.

SUMMARY OF THE INVENTION

The present invention comprehends an improved fluid test device which is extremely simple and economical of construction while yet providing an improved facilitated use in connection with testing of fluid systems.

The present invention comprehends such a device formed of a plurality of interconnected machined elements formed of rod stock with diaphragm valves mounted to opposite ends of the manifold portion so as to be external of the manifold and have the manually operable controls thereof extending forwardly for facilitated manipulation during the testing of the fluid system.

Gauges may be mounted to the valves so as to also face forwardly. The forwardly operable valves effectively close the opposite ends of the manifold and may define, with the manifold coplanar rear surfaces, facilitated connections such as by brazing of the valves to the ends of the manifold during assembly of the device.

The manifold may define a central, upwardly opening hanger recess which may be threaded, permitting mounting of the manifold to threaded supports, such as hangers, and portions of custom-designed housings.

A cover is provided for enclosing the assembly of the fabricated manifold and connected valves. In the illustrated embodiment, the cover comprises a snap-on cover which is installed subsequent to the assembly and testing of the fluid handling components.

The cover may have a back portion which is coplanar with the back surface of the gauges so as to provide a stable, flat back surface to the complete assembly.

Thus, the fluid test device of the present invention is extremely simple and economical of construction while yet providing the highly desirable features discussed above.

BRIEF DESCRIPTION OF THE DRAWING

Other features and advantages of the invention will be apparent from the following description taken in connection with the accompanying drawing wherein:

FIG. 3 is a fragmentary side elevation thereof;

FIG. 4 is a fragmentary exploded elevation thereof;

FIG. 5 is an enlarged vertical section taken substantially along the line 5—5 of FIG. 4 as during the assembly of the housing on the assembled manifold and valve structure;

FIG. 6 is a vertical section taken substantially along the line 6—6 of FIG. 4; and FIG. 7 is a fragmentary enlarged vertical section taken substantially along the lines 7—7 of FIG. 4.

DESCRIPTION OF THE PREFERRED EMBODIMENT

Figure 1:
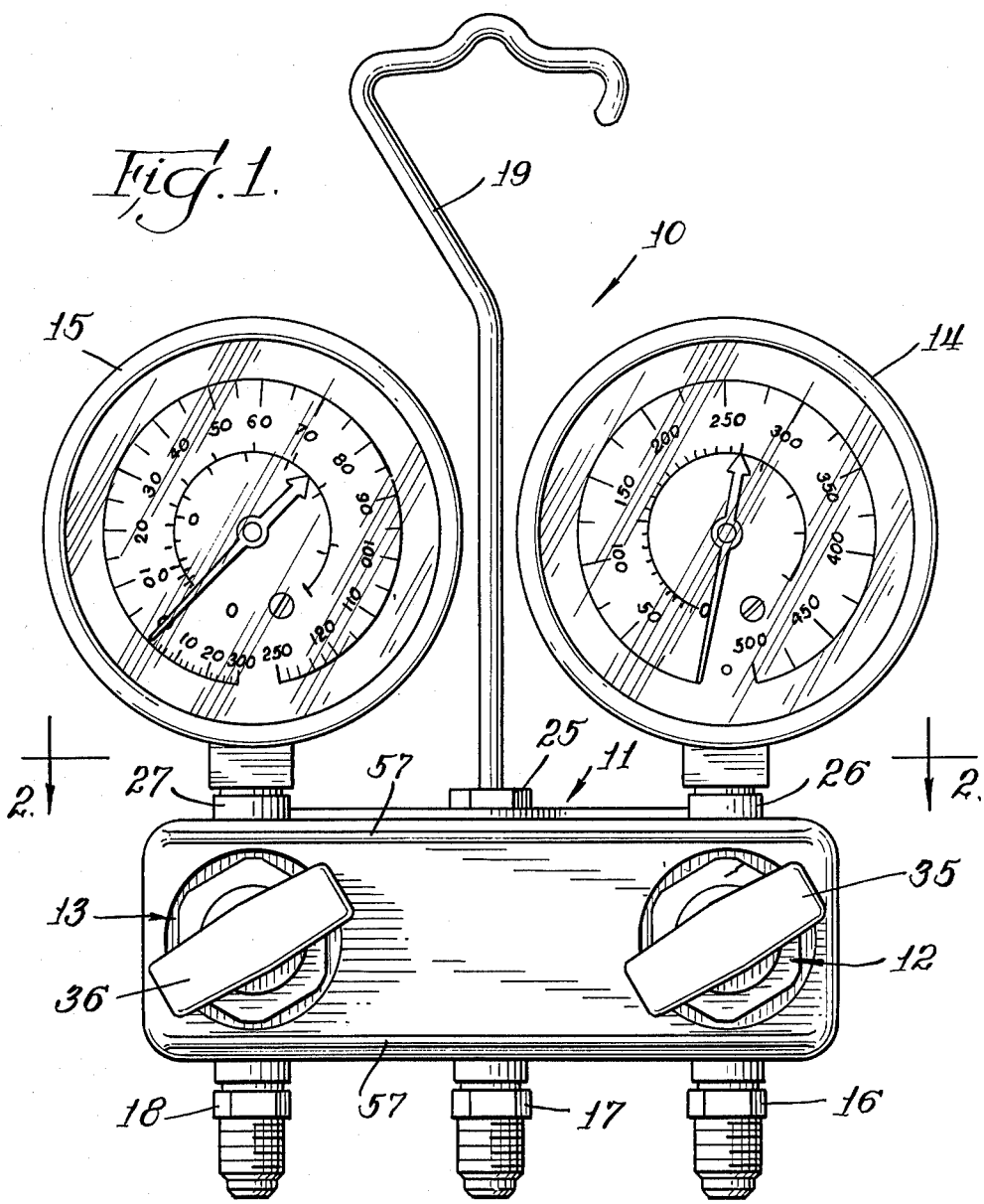
FIG. 1 is a front elevation of a fluid test device embodying the invention.

In the exemplary embodiment of the invention as disclosed in the drawing, a fluid test device generally designated 10 is shown to include a manifold generally designated 11, a first valve 12, a second valve 13, a first gauge 14, a second gauge 15, a first hose connector 16, a second hose connector 17, and a third hose connector 18. A hanger 19 may be provided for hanging the device during use, such as during the testing of a fluid system which illustratively may comprise an air conditioning system.

Figure 2:
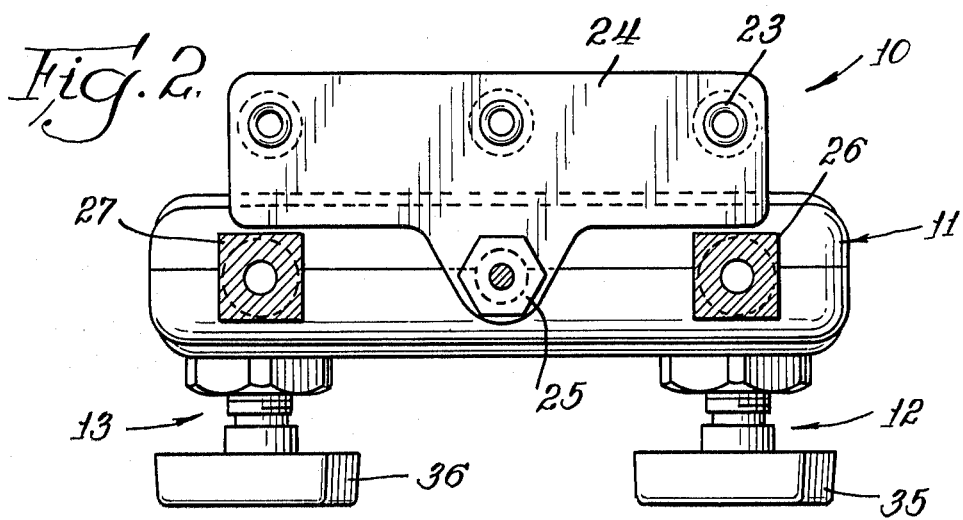
FIG. 2 is a transverse section taken substantially along the line 2—2 of FIG. 1.

As shown in FIGS. 2 and 3, the device may further include structure for closing the distal end of the hoses, such as hoses 20, 21 and 22, connected to hose connectors 16, 17 and 18, respectively. The distal ends may be closed by connection thereof to blind fittings, such as blind fitting 23, shown in FIG. 3 as mounted to a support plate 24. The support plate, as shown in FIG. 2, may be secured to the manifold by means of a nut 25 which may also be arranged to threadedly secure the hanger 19 to the manifold.

As further shown in FIGS. 1 and 2, gauge 14 is connected to the manifold by a suitable connector 26 and gauge 15 is connected to the manifold by a suitable connector 27.

As best seen in FIG. 4, manifold 11 comprises a fabricated assembly of a plurality of machined elements which illustratively may be formed of bar stock so as to provide high accuracy in the construction of the manifold. As shown in FIG. 4, the assembly may include a center element 29, a first transverse element 30, and a second transverse element 31 extending oppositely to element 30. Elements 29 and 30 may define internal flow passages 32, 33 and 34, respectively. Connector 17 is connected to flow passage 32 and passages 33 and 34 are in communication with passage 32 so as to provide fluid communication to the diaphragm valves 12 and 13, respectively.

Hose connector 16 is connected to valve 12 and hose connector 18 is connected to valve 13. Gauge 14 is connected to valve 12 and gauge 15 is connected to valve 13 to provide controlled communication between the different hoses and gauges as determined by the settings of the respective valves, as will be obvious to those skilled in the art.

As shown in FIG. 1, valves 12 and 13 are provided with operating handles 35 and 36, respectively, which are arranged to operate the valves from forwardly of the device. As further shown in FIG. 1, the gauges 14 and 15 face forwardly whereby facilitated testing operation may be effected by device 10.

As shown in FIG. 4, the arrangement of the manifold 11 and attached valves defines an open treelike arrangement. This arrangement is enclosed within a housing, or cover, 37 which may comprise a generally parallelepiped housing having a rear portion 38 and a front portion 39, as shown in FIG. 5, adapted to be snapped together about the assembly of the manifold element 11 and valves 12 and 13. More specificially, the rear portion 38 may be provided with a plurality of recesses 40 adapted to receive a corresponding complementary plurality of male connecting elements 21 to interlock the housing portions in assembled relationship, as shown in FIGS. 1, 2 and 3.

Rear housing portion 38 may be provided with upper, forwardly opening recesses 42 and lower, forwardly opening recesses 43, and front portion 39 may be provided with complementary rearwardly opening upper recesses 44 and lower recesses 45. The upper recesses cooperatively define openings in the assembled housing for accommodating the upward extension of the gauge connectors 26 and 27 and the hanger connector 25.

The lower recesses cooperatively define openings downwardly through which extend the connectors 16, 17 and 18 when the cover is disposed about the manifold and valves, as shown in FIGS. 1, 2 and 3.

The hanger connector 25 is illustrated more specifically in FIG. 6 to comprise a T-connector 46 having a lower threaded portion 47 threaded to a complementary threaded recess 48 in the manifold portion 29. The head portion 49 of the T-connector clamps the mounting plate 24 to the upper surface of the housing 37.

The T-connector further defines a downwardly opening recess 50 in which is received a lower end portion 51 of the hanger 19 having a plurality of radial projections 52 effectively retaining the lower portion 51 of the hanger within the recess 50.

As further shown in FIG. 6, manifold portion 29 may define an upwardly opening recess 53 receiving the distal lower end 54 of the hanger for further stabilizing the mounting of the hanger to the device.

As further shown in FIG. 6, the blind fittings 23 include upwardly extending neck portions 60 which are extended upwardly through suitable openings 61 in the mounting plate 24 and staked over to secure the fittings to the mounting plate. As illustrated in FIG. 3, when the device is not in use, the opposite ends of the hoses are closed by their connections to the fittings so as to effectively maintain the hoses free of foreign matter.

The housing rear portion 38 may include rearwardly projecting ribs 55, as shown in FIG. 3, which are substantially coplanar with the rear surface 56 of the gauges 14 and 15. The front portion 39 of the housing may be provided with similar forwardly projecting ribs 57.

The rear surface 58 of the valves 12 and 13 is preferably coplanar with the rear surface 59 of the manifold middle portion 29 so that automatic alignment of the valves and manifold portions 33 and 34 is effected during assembly of the manifold by the placement of the valves and assembled manifold structure on a flat surface permitting improved facilitated brazed sealed connection of the valves to the manifold elements 30 and 31, respectively.

As can best be seen in FIG. 6, the threaded connection of nut 25 to the manifold element 29 further serves to clamp the housing portions 38 and 39 synergistically to the manifold in assembled relationship. Thus, the mounting of the housing about the manifold and valve with the connectors 16, 17 18, 26 and 27 mounted thereto may be effected upon complete assembly and testing of the structure providing facilitated manufacturing and improved economy.

The housing may be formed of a molded synthetic resin and, thus, may have less resistance to impact forces than the brazed and connected assembly of the fluid handling components. Thus, damage to the housing may serve as an indication to the user that the device may have been dropped, thereby possibly affecting the sealed connection of the elements of the device.

The housing may be readily removed and replaced when desired, thereby facilitating servicing of the connections within the device when desired.

The foregoing disclosure of specific embodiments is illustrative of the broad inventive concepts comprehended by the invention.

I claim:

1. A fluid test device comprising:
a T-connector comprising an assembly of independently prefabricated machined elements including a center body defining a center port, a first transverse element secured to said center body and defining a left side port, a second transverse element secured to said center body and defining a right side port, and interconnecting passages;

a left valve having a prefabricated machined body defining a first port arranged to be connected to said T-connector first transverse element in communication with said left side port, a second port, and a third port;

a left gauge connected to said second port;

means defining a hose connection to said third port;

a right valve having a prefabricated machined body defining a fourth port arranged to be connected to said T-connector second transverse element in communication with said right side port, a fifth port, and a sixth port;

a right gauge connected to said fifth port;

means defining a hose connection to said sixth port, said left and right valves having front-operated manual operating means and said gauges having front-reading dials, said valves defining prefabricated machined structures;

means removably sealingly securing said valve bodies to said T-connector elements; and an outer cover removably enclosing the assembled T-connector, left valve and right valve, said cover closely fitting said assembly and including wall portions juxtaposed to said valves and said center body to provide a compact enclosure of said T-connector and valves.

2. The fluid test device of claim 1 wherein said T-connector and valves define rear surfaces, said T-connector left and right side ports being spaced forwardly of the rear surface of the T-connector, and said first and fourth ports of said valves being spaced forwardly of the rear surfaces thereof a distance substantially equal to the spacing of said left and right side ports from said rear surface of the T-connector to provide accurate alignment of said valves first and fourth ports with said T-connector left and right side ports during securing of the valves to said T-connector, by causing said rear surfaces to have a coplanar support during such securing.

3. The fluid test device of claim 1 wherein said cover defines a carrier opening, and said device further includes a carrier extending through said opening and removably secured to said manifold means for supporting said device in use.

4. A fluid test device comprising:

manifold means defining a plurality of machined elements interconnected to define a plurality of ports and interconnecting passages;

valve means connected to said manifold means to be disposed exteriorly thereof;

gauge means connected to one of said manifold and valve means to be disposed exteriorly thereof; and a removable cover enclosing said manifold means and valve means, said cover defining a parallelepiped configuration.

5. The fluid test device of claim 4 wherein said valve means define machined valve bodies formed of rod stock metal.

6. The fluid test device of claim 4 wherein said cover comprises a plurality of separable wall portions.

7. The fluid test device of claim 4 wherein said gauges define coplanar rear surfaces and said cover defines a rear surface coplanar with said gauge rear surfaces.

8. The fluid test device of claim 4 wherein said cover is formed of a synthetic resin.

9. The fluid test device of claim 4 wherein said cover is formed of a resilient, shock resistant material.

10. A fluid test device comprising:

manifold means defining a plurality of machined elements interconnected to define a plurality of ports and interconnecting passages;

valve means connected to said manifold means to be disposed exteriorly thereof;

gauge means connected to one of said manifold and valve means to be disposed exteriorly thereof; and a removable cover enclosing said manifold means and valve means, said cover comprising a plurality of separable wall portions having integral snap fastening means.

11. The fluid test device of claim 4 wherein said cover defines a plurality of hose openings, and said device further includes a plurality of hoses having portions extending through said hose openings and sealingly secured to at least one of said manifold means and valve means.

* * * * *

UNITED STATES PATENT AND TRADEMARK OFFICE
CERTIFICATE OF CORRECTION

PATENT NO. : 4,109,536
DATED : August 29, 1978
INVENTOR(S) : Richard V. Strybel

It is certified that error appears in the above-identified patent and that said Letters Patent are hereby corrected as shown below:

On the first sheet of the patent, item (73) should be inserted showing the name of the assignee --Gould Inc.--.

Signed and Sealed this

Twentieth Day of March 1979

[SEAL]

Attest:

RUTH C. MASON
Attesting Officer

DONALD W. BANNER
Commissioner of Patents and Trademarks